United States Patent [19]
Watanabe

[11] Patent Number: 6,137,605
[45] Date of Patent: Oct. 24, 2000

[54] OUTPUT POWER CONTROL SYSTEM FOR OPTICAL AMPLIFICATION REPEATER

[75] Inventor: Seiji Watanabe, Tokyo, Japan

[73] Assignee: NEC Corporation, Tokyo, Japan

[21] Appl. No.: 09/009,495

[22] Filed: Jan. 20, 1998

[30] Foreign Application Priority Data

Jan. 20, 1997 [JP] Japan .................................. 9-019592

[51] Int. Cl.[7] .................................................. H04J 14/02
[52] U.S. Cl. ........................... 359/124; 359/133; 359/161; 359/177; 359/349
[58] Field of Search ................................... 359/124, 133, 359/161, 177, 349

[56] References Cited

U.S. PATENT DOCUMENTS 5,463,487  10/1995  Epworth .................................. 359/124
5,995,274  11/1999  Sugaya et al. ........................... 359/337

FOREIGN PATENT DOCUMENTS 62-245740  10/1987  Japan .

*Primary Examiner*—Jason Chan
*Assistant Examiner*—Vu Lieu
*Attorney, Agent, or Firm*—Sughrue, Mion, Zinn Macpeak & Seas, PLLC

[57] ABSTRACT

It is the object of the invention to provide a WDM optical transmission system, in which the transmission performance of the system is optimized by keeping an optical power per an optical signal constant, independent of the number of the optical signals. An alternating current (AC) voltage of a frequency $f_1$ is supplied to a burst generator, and control bursts $S_1$ to $S_n$ (frequency $f_1$) with different transmitting times are generated by the burst generator. These control bursts are respectively supplied to laser diodes (LDs) provided with control circuits, and directly modulate the output of the LDs. Moreover, the output of the LDs are respectively modulated by external optical modulators, multiplexed by an optical coupler and emitted to an optical fiber. The optical amplification repeaters detects the number (n) of the bursts and so controls its output power that an optical power of each of the WDM optical signals maintains a predetermined level independent of the number (n) of the optical signals.

10 Claims, 6 Drawing Sheets

OUTPUT POWER CONTROL SYSTEM FOR OPTICAL AMPLIFICATION REPEATER

FIELD OF THE INVENTION

The invention relates to an output power control system for an optical amplification repeater used in a wavelength division multiplexed optical communication system.

BACKGROUND OF THE INVENTION

Recently, there has been wide spread use of; wavelength division multiplexed (WDM, hereinafter) optical communication system, in which a single optical fiber is used both as a transmission line and as an optical to electrical converter (an O/E converter, hereinafter) for converting an optical signal into an electrical signal for use as a receiver. In the WDM optical communication system, since a single optical fiber can propagate plural optical signals with different wavelengths, lights of different wavelengths are respectively assigned to plural electrical to optical converters (E/O converters, hereinafter), multiplexed and transmitted through the single optical fiber in a transmitter, and the received optical signals are demultiplexed and respectively received by the plural O/E converters in a receiver. Hence the transmission capacity of the system can be remarkably increased. When a transmission distance between the E/O and O/E converters is long in the aforementioned system, the input optical signal levels of the O/E converters are decreased on account of the transmission loss of the optical fiber, and it becomes difficult to precisely receive optical information.

Accordingly, an optical amplification repeater is inserted at an intermediate point, where the WDM optical signals are directly amplified. In the long distance optical communication system, in which the plural optical amplification repeaters are used, the output powers of the optical amplification repeaters should be selected so that the transmission characteristic of the system is optimized in order to minimize the effects of nonlinearity of the optical fiber and noise caused by spontaneous emission (ASE) in the optical amplification repeaters.

The important components of the conventional optical amplification repeater are an Er-doped (erbium doped) optical fiber and a laser diode (LD, hereinafter) for pumping the same. The light emitted from the LD is supplied to an end of the Er-doped optical fiber and pumps the same. When the WDM optical signals are supplied at the other end of the pumped Er-doped optical fiber, the incident WDM optical signals are amplified therealong. The output power of the optical amplification repeater is monitored at its output port via an O/E converter, which is fed back to the control circuit of the LD. The LD for pumping the Er-doped optical fiber is so controlled that the total output power of the optical amplification repeater maintains a predetermined value.

As mentioned in the above, since the conventional optical amplification repeater is so controlled that its total output power is kept to be constant independently of the state of the input optical signals, a total output power of the optical amplification repeater is invariant, even in cases when a failure arises in the optical transmitter of the WDM optical communication system or transmission capacity is expanded by increasing the number of the optical signals.

Accordingly, as shown in FIG. 2, an output power of each of the optical signals is changed in accordance with the number of the optical signals, and the transmission characteristic degrades in case that the number of the optical signals is small, hence this number cannot be selected at will.

SUMMARY OF THE INVENTION

Accordingly, it is an object of the invention to provide an output power control system for an optical amplification repeater used in a WDM optical communication system, in which an output power of each of the optical signals maintains a predetermined level independent of the number of the optical signals in the WDM optical signals.

According to the features of the invention, an output power control system for an optical amplification repeater in a WDM optical communication system comprises:

an optical transmitter provided with means for transmitting a subsidiary optical signal representing a number of WDM optical signals; and an optical amplification repeater provided with means for converting the subsidiary optical signal into the number of the WDM optical signals and so controlling an output power of the optical amplification repeater in accordance with the number of the WDM optical signals, such that an output power of each of the WDM optical signals is kept to be a predetermined level.

BRIEF DESCRIPTION OF THE DRAWINGS

The invention will be explained in more detail in conjunction with appended drawings, wherein.

DESCRIPTION OF THE PREFERRED EMBODIMENTS

Before explaining an output power control system for an optical amplification repeater used in a WDM optical transmission system in the preferred embodiment according to the invention, the aforementioned conventional optical amplification repeater will be explained.

Figure 1:
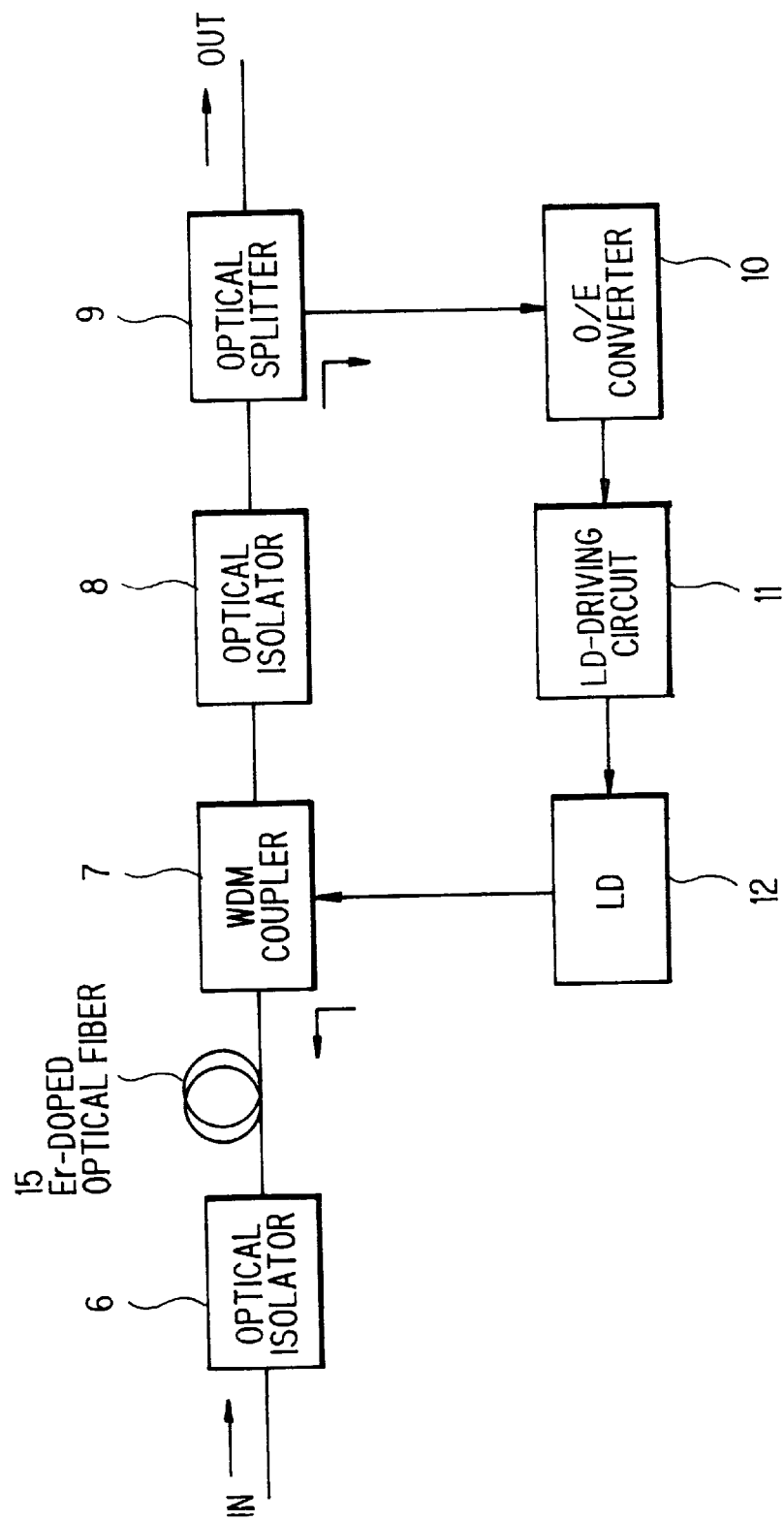
FIG. 1 is a block diagram for showing a structure of a conventional optical amplification repeater.
Figure 6:
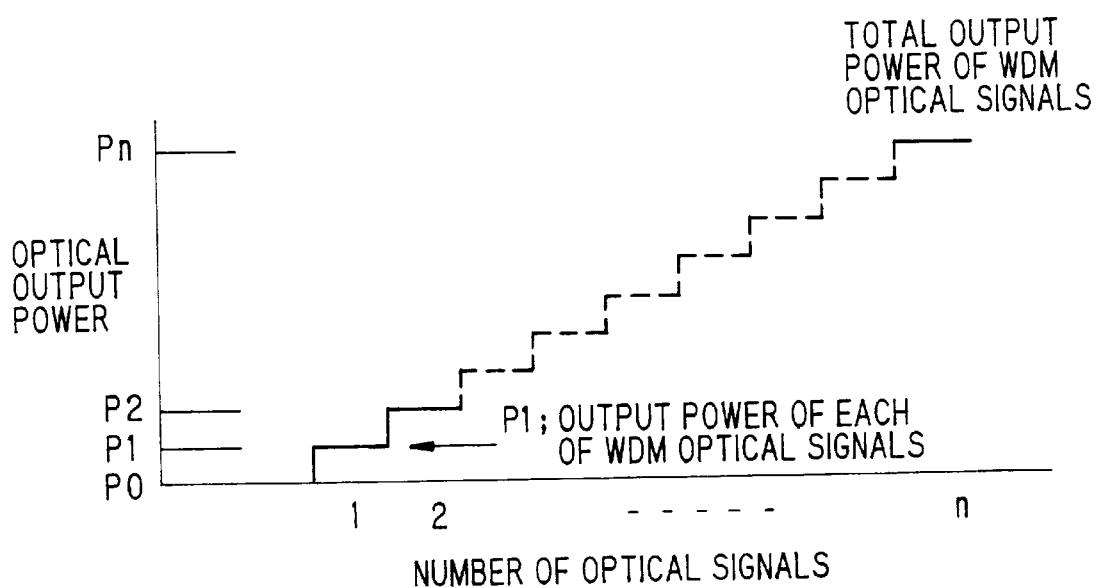
FIG. 6 is a diagram for explaining operation of an output power control system of the optical amplification repeater according to the invention.

FIG. 1 shows an example of an output power control system for a conventional optical amplification repeater of a backwards pumping type. In FIGS. 1, 6 and 8 are optical isolators, 7 is an WDM coupler, 9 is an optical splitter, 10 is an O/E converter, 11 is a LD-driving circuit, 15 is an Er(erbium)-doped optical fiber, and 12 is a LD for pumping the Er-doped fiber 15.

A light emitted from the LD 12 is supplied to an end of the Er-doped fiber 15 via the WDM coupler 7, where the light is absorbed by the Er-doped fiber 15 and excites Er atoms to their high energy states. When WDM optical signals from an input port IN are supplied to the other end of the pumped Er-doped fiber 15 via the isolator 6, the WDM optical signals are amplified along the Er-doped fiber 15. The amplified optical signals successively pass through the WDM coupler 7, the isolator 8 and the optical splitter 9, and are emitted from the output port OUT.

On the other hand, a part of the output power of the optical amplification repeater is split by the optical splitter 9, supplied to the O/E converter 10, converted into an electrical signal and supplied to the LD-driving circuit 11. The O/E converter 10 monitors the output power of the optical amplification repeater, and the output of the LD 12 for pumping the Er-doped fiber 15 is so controlled that the total output power of the optical amplification repeater is kept constant.

Figure 2:
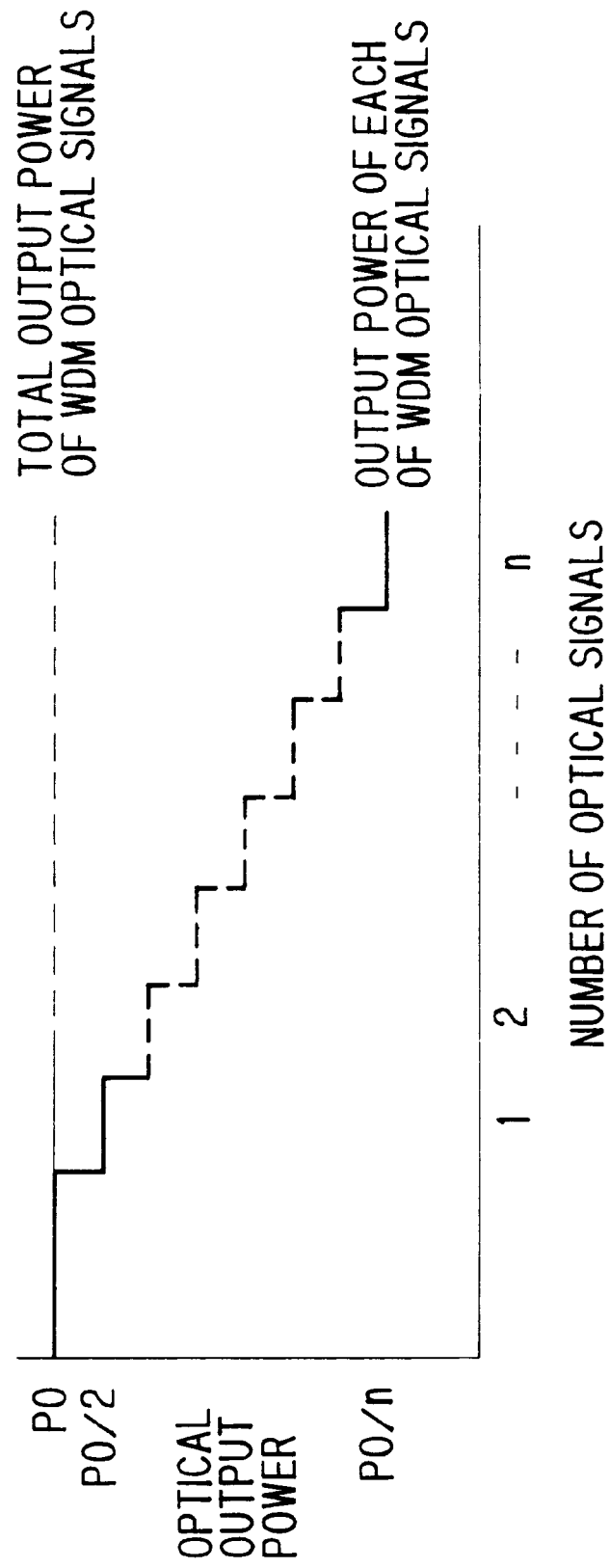
FIG. 2 is a diagram for explaining operation of an output power control system of the conventional optical amplification repeater.

FIG. 2 shows an optical output power of the optical amplification repeater as shown in FIG. 1, in which an optical output power per each optical signal is decreased as the number of optical signals are increased, because the total output power of WDM optical signals is kept constant. As understood from the result as shown in FIG. 2, the aforementioned disadvantages arise in the conventional optical amplification repeater.

Figure 3:
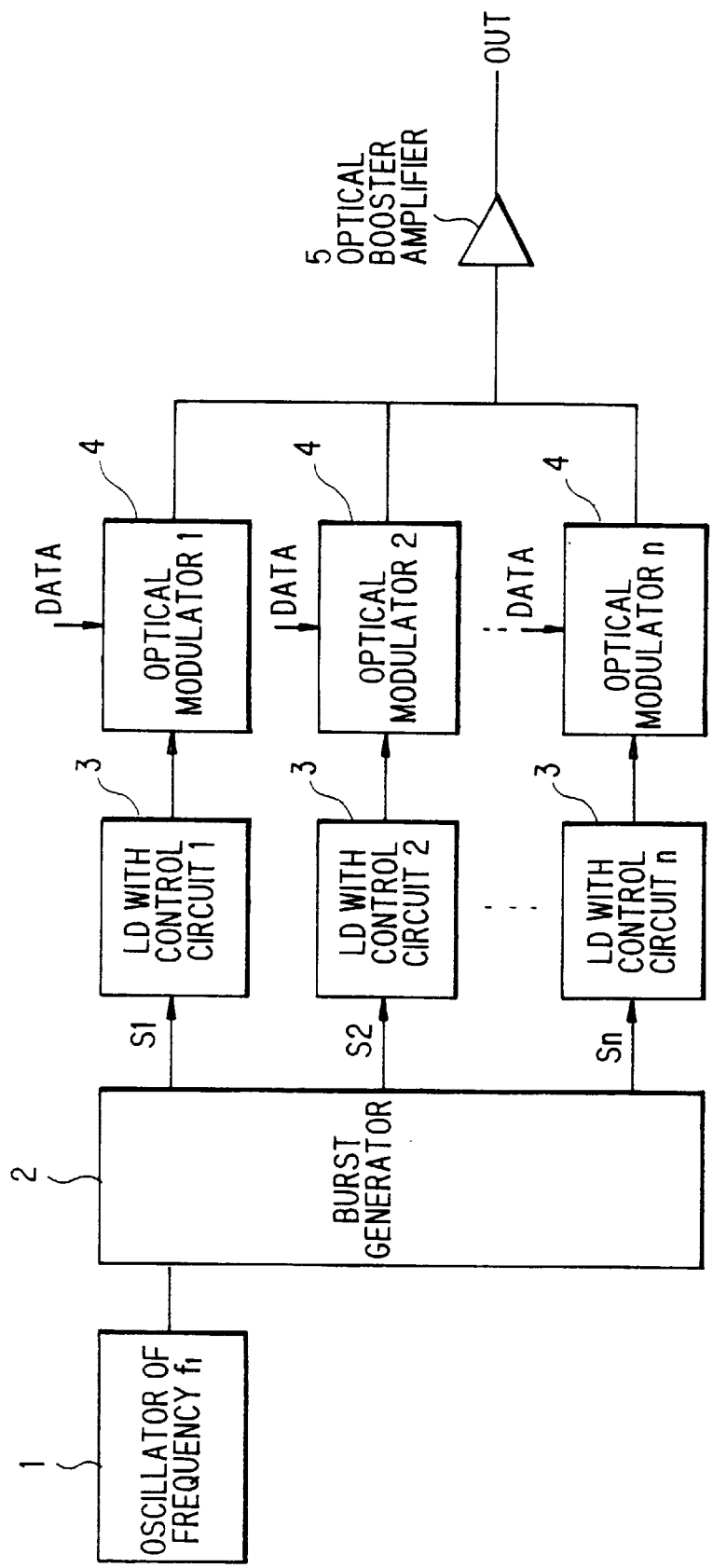
FIG. 3 shows a block diagram of an optical transmitter in a preferred embodiment according to the invention.

FIG. 3 shows an example of an optical transmitter according to the invention. In FIG. 3, 1 is a signal generator of a frequency $f_1$, 2 is a burst generator, 3 is a LD provided with a control circuit, 4 is an external optical modulator and 5 is an optical booster amplifier.

Figure 5:
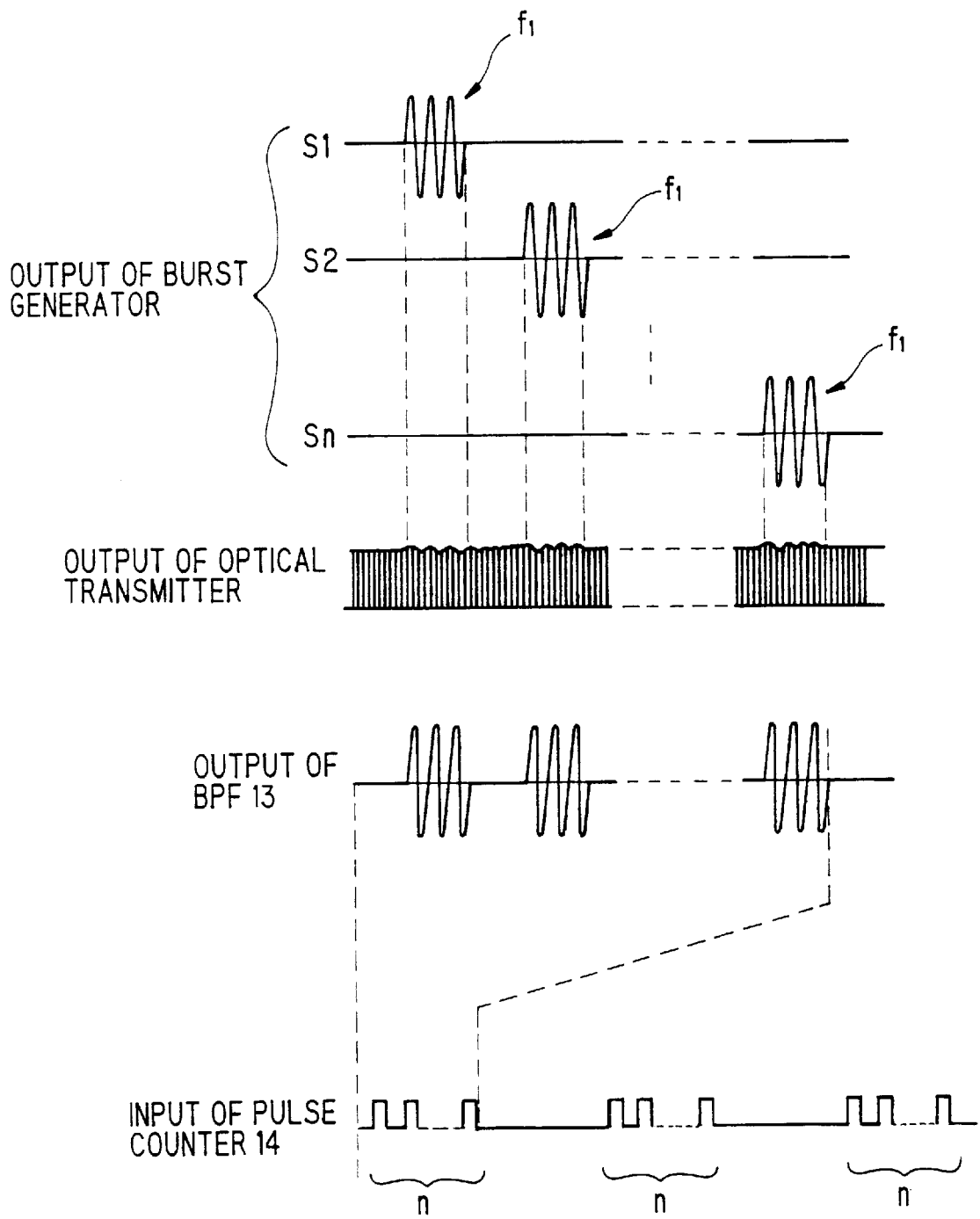
FIG. 5 is a diagram for explaining the insertion and detection of a signal representing the number of optical signals in the optical transmitter and the optical amplification repeater according to the invention.

The output of the signal generator 1 of the frequency $f_1$ is supplied to the burst generator 2. As shown in FIG. 5, the burst generator 2 periodically generates different control bursts $S_1$ to $S_n$ at a certain period, each of which comprises a sinusoidal component of the frequency $f_1$. These control bursts are respectively supplied to the LDs 3, and the optical signals are respectively modulated by the control bursts $S_1$ to $S_n$ so that the effects of modulations on the signal informations are negligible. Then, the optical signals generated by the LDs 3 are respectively modulated by signal data in the external optical modulators 4, multiplexed by a coupler (not shown), amplified by an optical booster amplifier 5 and supplied to an optical fiber.

Figure 4:
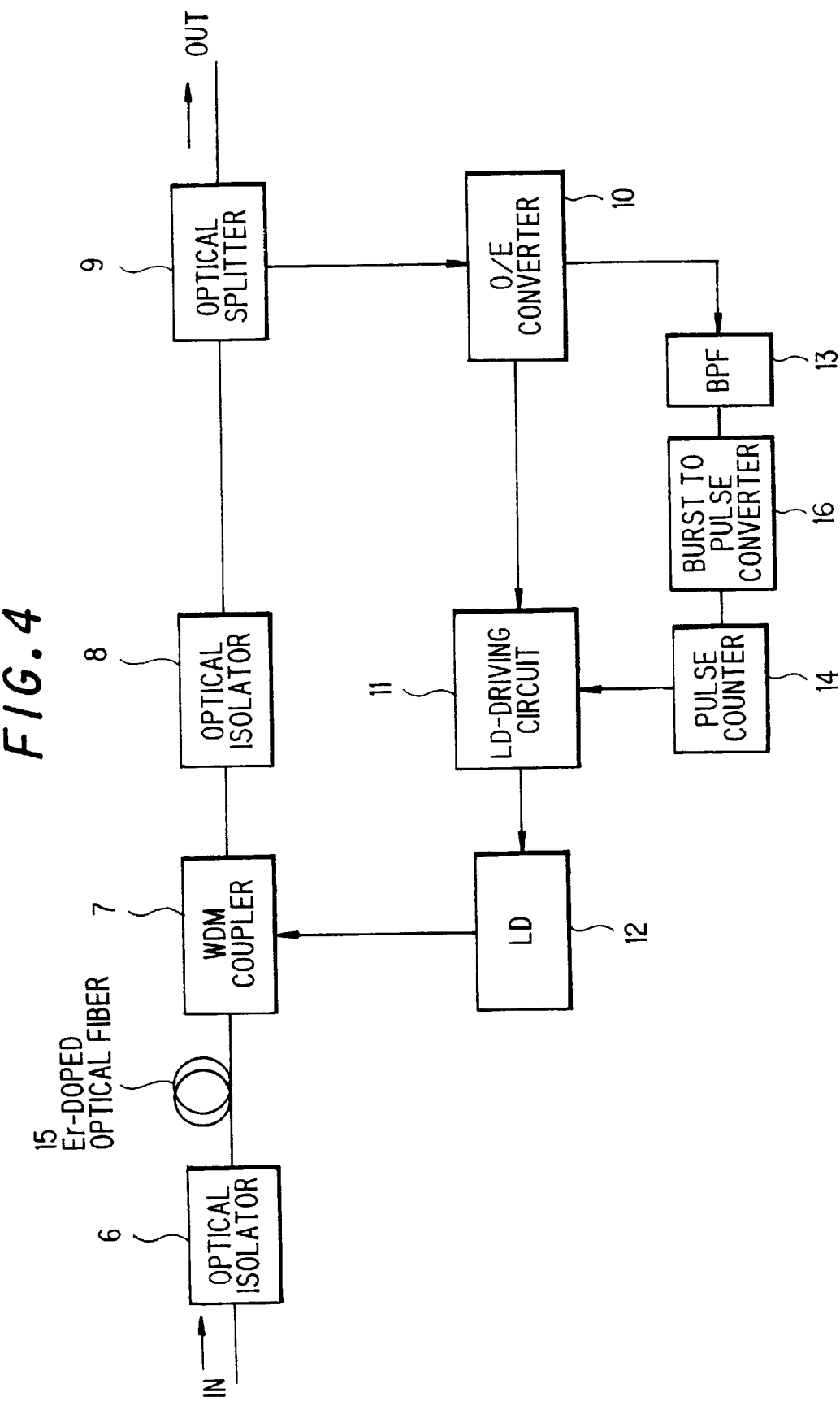
FIG. 4 shows a block diagram of an optical amplification repeater in a preferred embodiment according to the invention.

FIG. 4 shows an optical amplification repeater in the functions of structural elements, which are denoted by the same reference numerals as used in FIG. 1, are respectively the same. Moreover, the optical amplification repeater according to the invention is provided with a band pass filter 13, a burst to pulse converter 16 and a pulse counter 14.

The WDM optical signals, which are generated by the transmitter shown in FIG. 3, are supplied to an input port IN of the optical amplification repeater and amplified similarly to the case of the conventional optical amplification repeater shown in FIG. 1, and emitted from an output port OUT. On the other hand, a part of the output power of the optical amplification repeater is split by an optical splitter 9 and supplied to an O/E converter 10. An electrical signal, which is obtained by converting the WDM optical signals by the O/E converter 10, is supplied to a LD-driving circuit 11. The LD-driving circuit 11 so controls a LD 12 for pumping an Er-doped fiber 15 that the output power of the optical amplification repeater is kept at a predetermined level.

Furthermore, the output of the O/E converter 10 is supplied to a band pass filter (BPF) 13 with a center frequency of $f_1$ also, where the bursts transmitted from the optical transmitter shown in FIG. 3 are extracted. The extracted bursts are converted into pulses by a burst to pulse converter 16 and counted by a pulse counter 14. which generates a control signal corresponding to the number of pulses per the period of a repetition of the burst. The control signal is supplied to the LD-driving circuit 11, and, as shown in FIG. 6, the LD 12 for pumping the Er-doped fiber 15 is so controlled that the output power of the optical amplification repeater has a level corresponding to the number of the pulses counted by the pulse counter 14.

Accordingly, the output of the LD 12 for pumping the Er-doped fiber 15 is changed in accordance with the number of the optical signals, and while the number of the optical signals is constant, the output power of the optical amplification repeater maintains a constant value corresponding to the number of the optical signals.

As mentioned in the above, in an optical amplification repeater according to the invention, since the output power of the optical amplification repeater is controlled in accordance with the number of the optical signals transmitted from the optical transmitter, the output power of each of the optical signals is kept at a predetermined level independent of the number of the optical signals, hence the transmission characteristics are not degraded even in case that the number of the optical signals is changed, and the performance of the transmission system can be optimized.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. An output power control system for an optical amplification repeater in a wavelength division multiplexed (WDM, hereinafter) optical communication system, comprising:

an optical transmitter provided with means for transmitting a subsidiary optical signal representing a number of WDM optical signals; and an optical amplification repeater provided with means for converting said subsidiary optical signal into said number of said WDM optical signals and so controlling an output power of said optical amplification repeater in accordance with said number of said WDM optical signals, such that an output power of each of said WDM optical signals is kept to be a predetermined level;

wherein said means for transmitting said subsidiary optical signal includes means for assigning different times to bursts, said bursts being for said subsidiary optical signal, and means for periodically modulating said WDM optical signals at a predetermined period by said bursts, such that effects of modulations on information of said WDM optical signals are negligible.

2. The optical power control system as defined in claim 1, wherein:

said optical amplification repeater comprises a rare earth metal-doped optical fiber pumped by a pumping laser diode (LD, hereinafter), and said means for controlling said output power of said optical amplification repeater controls an output of said pumping LD in accordance with said number of said WDM optical signals.

3. The output power control system as defined in claim 2, wherein:

frequencies of sinusoidal components of said bursts are a same frequency.

4. The output power control system as defined in claim 1, wherein:

said optical amplification repeater extracts a series of said bursts by means of band pass filters, converts said series of bursts into a series of pulses and counts a number of said pulses per said predetermined period.

5. The output power control system as defined in claim 1, wherein:

said optical amplification repeater comprises a rare earth element-doped optical fiber amplifier for amplifying WDM optical signals in accordance with an excitation light supplied thereto from an excitation light source; and said optical amplification repeater controls said excitation light source to emit said excitation light having an output power dependent on said wavelength-multiplexed number of said WDM optical signals, so that an output power of each of said WDM optical signals amplified by said rare earth element-doped optical fiber amplifier is kept to be a predetermined level.

6. An optical power control system for an optical amplification repeater in a wavelength division multiplexed optical communication system, comprising:

an optical transmitter, comprising:
a plurality of light signal sources, each producing an optical signal;
a signal generator generating a frequency signal; and
a burst generator, supplied with the frequency signal by said signal generator, periodically generating a sequence of control bursts and individually modulating each optical signal with a separate control burst;
wherein each control burst comprises a sinusoidal component of the frequency signal; and
an optical amplification repeater, receiving, amplifying, and outputting the optical signals modulated by said optical transmitter, comprising:
a band-pass filter, isolating the sinusoidal frequency components of the control bursts from the optical signals;
a burst-to-pulse converter, converting the isolated control bursts into pulses;
a pulse counter, counting a number of pulses per periodic sequence;
an optical amplifier, amplifying the optical signals;
an optical amplifier driver, adjusting amplification of said optical amplifier according to the number of pulses counted per periodic sequence by said pulse counter;
wherein an output power of said optical amplification repeater for each of the optical signals is kept at a predetermined level.

7. The optical power control system as defined in claim 6, wherein said optical amplifier comprises:

a pumping laser diode, controlled by said optical amplifier driver and producing an excitation light;
a rare earth element-doped optical fiber amplifier, amplifying optical signals in accordance with the excitation light supplied by said pumping laser diode.

8. The optical power control system as defined in claim 6, wherein the sinusoidal component of all of the control bursts is a same frequency.

9. The optical power control system as defined in claim 6, wherein each optical signal is modulated by only a single control burst per periodic sequence.

10. A method of controlling an optical amplification repeater in a wavelength division multiplexed optical communication system, so as to maintain output power at a predetermined level for each optical wavelength signal, comprising the steps of:

generating a periodic sequence of control bursts, each control burst comprising a sinusoidal frequency component;
modulating each optical wavelength signal individually with a separate control burst of the sequence of control bursts;
transmitting the modulated optical wavelength signals to the optical amplification repeater and isolating, upon reception, the sinusoidal frequency components of the control bursts from the modulated optical wavelength signal;
counting a number of isolated control bursts per periodic sequence;
adjusting an amplification power of the optical amplification repeater according to the number of counted control bursts;
amplifying the optical wavelength signals at the adjusted power level and outputting the amplified signals.

* * * * *